US012789299B2

(12) United States Patent
Manjon Fernandez et al.

(10) Patent No.: US 12,789,299 B2
(45) Date of Patent: Nov. 10, 2026

(54) METHOD FOR THE MANUFACTURE OF A WELDED JOINT BY NARROW GAP WELDING

(71) Applicant: VERDICIO SOLUTIONS A.I.E., Madrid (ES)

(72) Inventors: Alvaro Manjon Fernandez, Oviedo Asturias (ES); Sivasambu Bohm, Godmanchester (GB); Marcos Perez Rodriguez, Cangas del Narcea Asturias (ES); Roberto Suarez Sanchez, Cangas del Narcea Asturias (ES)

(73) Assignee: VERDICIOSOLUTIONS A.I.E., Madrid (ES)

( * ) Notice: Subject to any disclaimer, the term of this patent is extended or adjusted under 35 U.S.C. 154(b) by 681 days.

(21) Appl. No.: 18/031,264

(22) PCT Filed: Oct. 21, 2020

(86) PCT No.: PCT/IB2020/059872

§ 371 (c)(1),
(2) Date: Apr. 11, 2023

(87) PCT Pub. No.: WO2022/084717

PCT Pub. Date: Apr. 28, 2022

(65) Prior Publication Data

US 2023/0373038 A1 Nov. 23, 2023

(51) Int. Cl.
*B23K 35/365* (2006.01)
*B23K 35/02* (2006.01)

(52) U.S. Cl.
CPC ............ *B23K 35/365* (2013.01); *B23K 35/02* (2013.01)

(58) Field of Classification Search
CPC ........ B23K 35/02; B23K 35/26; B23K 35/36; B23K 35/365; B23K 35/3608; B23K 26/348; B23K 26/322; B23K 26/0006
See application file for complete search history.

(56) References Cited

U.S. PATENT DOCUMENTS

| | | | | |
|---|---|---|---|---|
| 3,588,432 | A | 6/1971 | Arnoldy et al. | |
| 3,627,574 | A | 12/1971 | DeLong et al. | |
| 4,314,136 | A | 2/1982 | Kotecki et al. | |
| 4,723,060 | A | 2/1988 | Arnoldy et al. | |
| 6,339,209 | B1 * | 1/2002 | Kotecki | B23K 35/368 219/146.1 |
| 6,664,508 | B1 * | 12/2003 | Johnson | B23K 35/362 219/136 |
| 2004/0009300 | A1 * | 1/2004 | Shimakura | C23C 22/34 427/407.1 |
| 2006/0219685 | A1 | 10/2006 | Karogal et al. | |
| 2013/0299460 | A1 | 11/2013 | Wu et al. | |
| 2014/0124482 | A1 | 5/2014 | Katiyar et al. | |

FOREIGN PATENT DOCUMENTS

| | | | | |
|---|---|---|---|---|
| BE | 754889 | A | 1/1971 | |
| CA | 2535145 | A1 | 12/2006 | |
| EP | 1537940 | A1 | 6/2005 | |
| EP | 1698428 | A1 | 9/2006 | |
| EP | 1710042 | A1 | 10/2006 | |
| EP | 1710043 | A1 | 10/2006 | |
| GB | 1 336182 | A | 11/1973 | |
| JP | 2006289494 | A | 10/2006 | |
| WO | WO0016940 | | 3/2000 | |
| WO | WO 0059674 | A1 | 10/2000 | |
| WO | WO 2009/086193 | A2 | 7/2009 | |
| WO | WO 2020/212735 | A1 | 10/2020 | |
| WO | WO-2020212885 | A1 * | 10/2020 | C09D 5/08 |
| WO | WO 2022/084716 | A1 | 4/2022 | |
| WO | WO 2022/084717 | A1 | 4/2022 | |
| WO | WO 2022/084718 | A1 | 4/2022 | |
| WO | WO 2022/084719 | A1 | 4/2022 | |
| WO | WO 2022084720 | A1 | 4/2022 | |

OTHER PUBLICATIONS

Balos, et al. "Metal Oxide Nanoparticle-Based Coating as a Catalyzer for A-TIG welding: Critical Raw Material Perspective," MDPI, Metals, May 15, 2019 (Year: 2019).*
Zhu, et al., "U-shaped Flux strip constraining Arc Ultra-narrow Gap Welding Device and Welding Method," CPO, CN 102151955 A, Aug. 17, 2011 (Year: 2011).*
Fu, et al., "Welding method for extra heavy steel plates," JPO, JP 4952892B2, Jun. 13, 2012 (Year: 2012).*
Nakamura, et al., "Narrow Groove Weld Joint Using Laser Arc Hybrid Weld Method and Manufacturing Method for the Same," JPO JP 2017154156A, Sep. 7, 2017 (Year: 2017).*
Search Report of PCT/IB2020/059876 of Nov. 12, 2020 and International Report on Patentability.
Search Report of PCT/IB2020/059872 of Jun. 22, 2021 and International Report on Patentability.
Search Report of PCT/IB2020/059874 of Aug. 7, 2021 and International Report on Patentability.
Search Report of PCT/IB2020/059875 of Jun. 22, 2021 and International Report on Patentability.
Search Report of PCT/IB2020/059871 of Jun. 7, 2021 and International Report on Patentability.
Balos Sebastian et al, "Metal Oxide Nanoparticle-Based Coating as a Catalyzer for A-TIG Welding: Critical Raw Material Perspective", Metals, (May 15, 2019), vol. 9, No. 5, doi:10.3390/met9050567, p. 567.

* cited by examiner

*Primary Examiner* — Nathaniel E Wiehe
*Assistant Examiner* — Joshua R Beebe
(74) *Attorney, Agent, or Firm* — Davidson Kappel LLC

(57) ABSTRACT

A method for the manufacture of a welded joint have the following successive steps: I. the provision of at least two metallic substrates wherein at least one metallic substrate is a steel substrate having a thickness of at least 50 mm and being delimited by at least one sidewall, wherein said sidewall is at least partially coated with a pre-coating having a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, and II. the welding of the at least two metallic substrates along the at least partially coated sidewall by narrow gap welding.

19 Claims, No Drawings

METHOD FOR THE MANUFACTURE OF A WELDED JOINT BY NARROW GAP WELDING

The present invention relates to the welding of metallic substrates by narrow gap welding, in particular in the case where at least one of the metallic substrates is a steel substrate locally coated with a welding flux to improve the quality of the weld. It also relates to the corresponding steel substrate and to the method for the manufacture of the steel substrate. It is particularly well suited for construction, shipbuilding, oil&gas and offshore industries.

BACKGROUND

It is known to weld steel substrates thicker than about 50 mm by narrow gap welding, also known as narrow groove welding. This welding technique can be defined as a multi-pass welding process with filler metal in-between two substrates spaced by a gap which is narrow compared to the substrate thickness. The gap can be a single V groove with a small root opening and sidewalls inclined up to about 5° or it can be a narrow gap of constant width. The narrow-gap welding technique is well-established for submerged arc welding (SAW), gas metal arc welding (GMAW) and gas tungsten arc welding (GTAW).

During narrow-gap welding, different defects can occur, such as lack of fusion of the sidewalls, slag entrapment, centerline cracking or undercutting when the weld reduces the cross-sectional thickness of the base metal.

SUMMARY OF THE INVENTION

The occurrence of these defects can be mitigated by strictly setting the welding parameters through robotized welding notably. Nevertheless, this solution does give full satisfaction.

There is thus a need for improving the quality of the weld made by narrow gap welding and therefore the mechanical properties of welded steel substrates. There is also a need for increasing the deposition rate and productivity of the narrow gap welding.

To this end, the invention relates to a method for the manufacture of a welded joint comprising the following successive steps:

I. The provision of at least two metallic substrates wherein at least one metallic substrate is a steel substrate having a thickness of at least 50 mm and being delimited by at least one sidewall, wherein said sidewall is at least partially coated with a pre-coating comprising a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, and II. The welding of the at least two metallic substrates along the at least partially coated sidewall by narrow gap welding.

The method according to the invention may also have the optional features listed below, considered individually or in combination:

- the titanate is chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ or mixtures thereof,
- the thickness of the pre-coating is between 10 to 140 μm,
- the percentage of the nanoparticulate oxide in the pre-coating is below or equal to 80 wt. %,
- the percentage of the nanoparticulate oxide in the pre-coating is above or equal to 10 wt. %,
- the nanoparticles have a size comprised between 5 and 60 nm,
- the percentage of titanate in the pre-coating is above or equal to 45 wt. %,
- the diameter of the titanate is between 1 and 40 μm,
- the pre-coating further comprises a binder,
- the percentage of binder in the pre-coating is between 1 and 20 wt. %,
- the narrow gap welding is done with one welding technique selected among submerged arc welding, gas metal arc welding and gas tungsten arc welding,
- the precoating further comprises microparticulate compounds selected among microparticulate oxides and/or microparticulate fluorides,
- the precoating further comprises microparticulate compounds selected from the list consisting of $CeO_2$, $Na_2O$, $Na_2O_2$, $NaBiO_3$, NaF, $CaF_2$, cryolite ($Na_3AlF_6$) and mixtures thereof.

The invention also relates to a method for the manufacture of a pre-coated steel substrate comprising the successive following steps:

A. The provision of a steel substrate having a thickness of at least 50 mm and being delimited by at least one sidewall, B. The deposition, at least partially on said sidewall, of a pre-coating solution comprising a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof.

The method for the manufacture of a pre-coated steel substrate according to the invention may also have the optional features listed below, considered individually or in combination:

- in step B), the deposition of the pre-coating solution is performed by spin coating, spray coating, dip coating or brush coating,
- in step B), the pre-coating solution further comprises a solvent,
- in step B), the pre-coating solution comprises from 1 to 200 g/L of nanoparticulate oxide,
- in step B), the pre-coating solution comprises from 100 to 500 g/L of titanate,
- in step B), the pre-coating solution further comprises a binder precursor,
- The method further comprises a drying step of the pre-coated steel substrate obtained in step B).

The invention also relates to a steel substrate having a thickness of at least 50 mm and being delimited by at least one sidewall, wherein said sidewall is at least partially coated with a pre-coating comprising a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof.

DETAILED DESCRIPTION

The following terms are defined:

- Nanoparticles are particles between 1 and 100 nanometers (nm) in size.
- Titanate refers to inorganic compounds containing titanium, oxygen and at least one additional element, such as an alkali metal element, alkaline-earth element, transition metal element or metallic element. They can be in the form of their salts.
- "coated" means that the steel substrate is at least locally covered with the pre-coating. The covering can be for example limited to the area where the steel substrate will be welded. "coated" inclusively includes "directly on" (no intermediate materials, elements or space disposed therebetween) and "indirectly on" (intermediate materials, elements or space disposed therebetween). For example, coating the steel substrate can include applying the pre-coating directly on the substrate with no intermediate materials/elements therebetween, as well as applying the pre-coating indirectly on the substrate with one or more intermediate materials/elements therebetween (such as an anticorrosion coating).

Without willing to be bound by any theory, it is believed that the pre-coating mainly modifies the arc and melt pool physics. It seems that, in the present invention, not only the nature of the compounds, but also the size of the oxide particles being equal to or below 100 nm modifies the arc and melt pool physics.

Indeed, the arc melts and incorporates the pre-coating in the molten metal in the form of dissolved species and in the arc in the form of ionized species. Thanks to the presence of titanate and oxide nanoparticles in the arc, the arc is constricted.

Moreover, the pre-coating dissolved in the molten metal modifies the Marangoni flow, which is the mass transfer at the liquid-gas interface due to the surface tension gradient. In particular, the components of the pre-coating modify the gradient of surface tension along the interface. This modification of surface tension results in an inversion of the fluid flow towards the center of the weld pool. In combination with a higher plasma temperature due to the arc constriction, this inversion leads to improvements in the weld penetration and in the welding efficiency leading to an increase in deposition rate and thus in productivity. Without willing to be bound by any theory, it is believed that the nanoparticles dissolve at lower temperature than microparticles and therefore more oxygen is dissolved in the melt pool, which activate the reverse Marangoni flow.

Furthermore, the dissolved oxygen acts as a surfactant, improving the wetting of the molten metal on the base metal and therefore avoiding critical defects prone to appear in the narrow gap welding process, such as lack of sidewall fusion and undercutting.

Moreover, as the components of the pre-coating make the surface tension increase with temperature, the wettability of the weld material increases along the sidewalls which are colder than the center of the melt pool, which prevents slag entrapment.

Additionally, it has been observed that the nanoparticles improve the homogeneity of the applied pre-coating by filling the gaps between the microparticles and covering the surface of the microparticles. It helps stabilizing the welding arc, thus improving the weld penetration and quality.

The invention will be better understood by reading the following description, which is provided purely for purposes of explanation and is in no way intended to be restrictive.

The pre-coating comprises a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof. In other words, the pre-coating comprises a titanate and at least one nanoparticulate oxide, wherein the at least one nanoparticulate oxide is selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof. This means that the pre-coating doesn't comprise any other nanoparticulate oxide than the ones listed.

The titanate is selected from the group of titanates consisting of alkali metal titanates, alkaline-earth titanates, transition metal titanates, metal titanates and mixtures thereof. The titanate is more preferably chosen from among: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ and mixtures thereof. It is believed that these titanates further increase the penetration depth based on the effect of the reverse Marangoni flow. It is the inventors understanding that all titanates behave, in some measure, similarly and increase the penetration depth. All titanates are thus part of the invention. The person skilled in the art will know which one has to be selected depending on the specific case. To do so, he will take into account how easily the titanates melt and dissolve, how much they increase the dissolved oxygen content, how the additional element of the titanate affects the melt pool physics and the microstructure of the final weld. For example, $NaTiO_7$ is favored due to the presence of Na that improves the slag formation and detachment.

Preferably, the titanate has a diameter between 1 and 40 μm, more preferably between 1 and 20 μm and advantageously between 1 and 10 μm. It is believed that this titanate diameter further improves the arc constriction and the reverse Marangoni effect. Moreover, having small micrometric titanate particles increases the specific surface area available for the mix with the nanoparticulate oxides and have the latter further adhere to the titanate particles. It also makes the particles easier to spray.

Preferably, the percentage in weight of the titanate in dry weight of pre-coating is above or equal to 45%, more preferably between 45% and 90% and even more preferably between 45% and 75%.

The nanoparticulate oxide is chosen from $TiO_2$, $SiO_2$, $ZrO_2$, $Y_2O_3$, $Al_2O_3$, $MoO_3$, $CrO_3$, $CeO_2$, $La_2O_3$ and mixtures thereof. These nanoparticles dissolve easily in the melt pool, provide oxygen to the melt pool and, consequently, improve the wettability and allow for a deeper weld penetration. Contrary to other oxides, such as CaO, MgO, $B_2O_3$, $Co_3O_4$ or $Cr_2O_3$, they do not tend to form brittle phases, they do not have a high refractory effect that would prevent the heat from correctly melting the steel and their metal ions do not tend to recombine with oxygen in the melt pool.

Preferably, the nanoparticles are $SiO_2$ and/or $TiO_2$, and more preferably a mixture of $SiO_2$ and $TiO_2$. It is believed that $SiO_2$ mainly increases the penetration depth and eases the slag removal while $TiO_2$ mainly increases the penetration depth and forms Ti-based inclusions which improve the mechanical properties.

Other examples of mixtures of nanoparticulate oxides are:

- Yttria-stabilized zirconia (YSZ) which is a ceramic in which the cubic crystal structure of zirconium dioxide ($ZrO_2$) is made stable at room temperature by an addition of yttrium oxide ($Y_2O_3$),
- A 1:1:1 combination of $La_2O_3$, $ZrO_2$ and $Y_2O_3$, which helps adjusting the refractory effect and promote the formation of inclusions.

Preferably, the nanoparticles have a size comprised between 5 and 60 nm. It is believed that this nanoparticles diameter further improves the homogeneous distribution of the coating.

Preferably, the percentage in weight of the nanoparticulate oxide in dry weight of pre-coating is below or equal to 80%, preferably above or equal to 10%, more preferably between 10 and 60%, even more preferably between 20 and 55%. In some cases, the percentage of nanoparticles may have to be limited to avoid a too high refractory effect. The person skilled in the art who knows the refractory effect of each kind of nanoparticles will adapt the percentage case by case.

According to one variant of the invention, once the pre-coating is applied on the steel substrate and dried, it consists of a titanate and a nanoparticulate oxide.

According to another variant of the invention, the pre-coating further comprises at least one binder embedding the titanate and the nanoparticulate oxide and improving the adhesion of the pre-coating on the steel substrate. This improved adhesion further prevents the particles of the pre-coating from being blown away by the flow of the shielding gas when such a gas is used. Preferably, the binder is purely inorganic, notably to avoid fumes that an organic binder could possibly generate during welding. Examples of inorganic binders are sol-gels of organofunctional silanes or siloxanes. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Amino-alkyl silanes are particularly preferred as they are greatly promoting the adhesion and have a long shelf life. Preferably, the binder is added in an amount of 1 to 20 wt % of the dried pre-coating.

According to another variant of the invention, the pre-coating further comprises microparticulate compounds, such as microparticulate oxides and/or microparticulate fluorides, such as, for example, $CeO_2$, $Na_2O$, $Na_2O_2$, $NaBiO_3$, NaF, $CaF_2$, cryolite ($Na_3AlF_6$). Moving from nanoparticles to microparticles for some of the nanoparticulate oxides listed above alleviate the health and safety concerns related to the use of some of these oxides. $Na_2O$, $Na_2O_2$, $NaBiO_3$, NaF, $CaF_2$, cryolite can be added to improve the slag formation so that slag entrapment is further prevented. They also help forming an easily detachable slag. The pre-coating can comprise from 0.1 to 5 wt %, in dry weight of pre-coating, of $Na_2O$, $Na_2O_2$, $NaBiO_3$, NaF, $CaF_2$, cryolite or mixture thereof.

Preferably the thickness of the pre-coating is between 10 to 140 μm, more preferably between 30 to 100 μm.

The pre-coating covers at least partially one sidewall of a steel substrate. The latter can have any shape compatible with the narrow gap welding. For the purpose of the invention, it is simply defined by a thickness of at least 50 mm, so that it is compatible with narrow gap welding, and by a sidewall to be at least partially welded to another metallic substrate. The sidewall is optionally beveled to further improve the welding by narrow gap. The angle of the bevel usually ranges from 2 to 20° and more preferably from 2 to 5°. It is worth mentioning here that the improved wetting provided by the pre-coating makes it acceptable to have defects on the bevel. Consequently, the usual expensive and detailed machining of the bevel to obtain a very smooth surface without defect can be avoided. Preferably, the bevel is milled so that the roughness Rz is higher than 4 μm, more preferably comprised between 4 and 16 μm. Such roughness also improves the adhesion of the pre-coating on the bevel.

Preferably, the steel substrate is carbon steel.

The steel substrate can be optionally coated on at least part of one of its sides by an anti-corrosion coating. Preferably, the anti-corrosion coating comprises a metal selected from the group consisting of zinc, aluminium, copper, silicon, iron, magnesium, titanium, nickel, chromium, manganese and their alloys.

In a preferred embodiment, the anti-corrosion coating is an aluminium-based coating comprising less than 15 wt. % Si, less than 5.0 wt. % Fe, optionally 0.1 to 8.0 wt. % Mg and optionally 0.1 to 30.0 wt. % Zn, the remainder being Al and the unavoidable impurities resulting from the manufacturing process. In another preferred embodiment, the anti-corrosion coating is a zinc-based coating comprising 0.01-8.0 wt. % Al, optionally 0.2-8.0 wt. % Mg, the remainder being Zn and the unavoidable impurities resulting from the manufacturing process.

The anti-corrosion coating is preferably applied on both sides of the steel substrate.

In term of process, once a steel substrate has been provided, a pre-coating solution is applied at least partially on the substrate sidewall so as to form the pre-coating.

The pre-coating solution comprises a titanate and a nanoparticulate oxide, as described above for the pre-coating. In particular, it comprises from 100 to 500 g/L of titanate, more preferably between 175 and 250 $g \cdot L^{-1}$. In particular, it comprises from 1 to 200 $g \cdot L^{-1}$ of nanoparticulate oxide, more preferably between 5 and 80 $g \cdot L^{-1}$. Thanks to these concentrations in titanate and nanoparticulate oxide, the quality of the weld obtained with the help of the corresponding pre-coating is further improved.

Advantageously, the pre-coating solution further comprises a solvent. It allows for a well dispersed pre-coating. Preferably, the solvent is volatile at ambient temperature. For example, the solvent is chosen from among: water, volatile organic solvents such as acetone, methanol, isopropanol, ethanol, ethyl acetate, diethyl ether and non-volatile organic solvents such as ethylene glycol.

According to one variant of the invention, the pre-coating solution further comprises a binder precursor to embed the titanate and the nanoparticulate oxide and to improve the adhesion of the pre-coating on the steel substrate. Preferably, the binder precursor is a sol of at least one organofunctional silane. Examples of organofunctional silanes are silanes functionalized with groups notably of the families of amines, diamines, alkyls, amino-alkyls, aryls, epoxys, methacryls, fluoroalkyls, alkoxys, vinyls, mercaptos and aryls. Preferably, the binder precursor is added in an amount of 40 to 400 $g \cdot L^{-1}$ of the pre-coating solution.

The pre-coating solution can be obtained by first mixing titanate and nanoparticulate oxide. It can be done either in wet conditions with a solvent such as acetone or in dry conditions for example in a 3D powder shaker mixer. The mixing favors the aggregation of the nanoparticles on the titanate particles which prevents the unintentional release of nanoparticles in the air, which would be a health and safety issue.

The deposition of the pre-coating solution can be notably done by spin coating, spray coating, dip coating or brush coating.

Preferably, the pre-coating solution is deposited locally only. In particular, the pre-coating solution is applied in the area of the sidewall where the steel substrate will be welded.

Once the pre-coating solution has been applied on the steel substrate, it can optionally be dried. The drying can be performed by blowing air or inert gases at ambient or hot temperature. When the pre-coating comprises a binder, the drying step is preferably also a curing step during which the binder is cured. The curing can be performed by Infra-Red (IR), Near Infra-Red (NIR), conventional oven.

Preferably, the drying step is not performed when the organic solvent is volatile at ambient temperature. In that case, the organic solvent evaporates leading to a dried pre-coating on the metallic substrate.

Once the pre-coating has been formed on a part of the sidewall of the steel substrate, this part can be welded to another metallic substrate by narrow gap welding.

Narrow Gap welding is well-established for submerged arc welding (SAW), gas metal arc welding (GMAW) and gas tungsten arc welding (GTAW). All these welding techniques can benefit from the present invention. Any other narrow gap welding technique could also benefit from the present invention.

The other metallic substrate can be a steel substrate of the same composition or of a different composition than the pre-coated steel substrate. It can also be made of another metal, such as for example, aluminium. More preferably, the other metallic substrate is a pre-coated steel substrate according to the present invention. The other metallic substrate is positioned along the pre-coated sidewall of the steel substrate and separated by gap narrow compared to the steel thickness. The gap is typically 8 to 25 mm wide while the steel is typically 50 to 350 mm thick. The two substrates are then welded by narrow gap welding.

The average electric current is preferably between 100 and 1000A. The voltage is preferably between 8 and 30V.

Depending on the welding technique, there can be a consumable electrode in the form of a wire (SAW, GMAW) or, if the electrode is not consumable, a material to fill the joint can be fed from the side in the form of a wire (GTAW). In both cases, the wire is for example made of Fe, Si, C, Mn, Mo and/or Ni.

Depending on the welding technique, the narrow gap can be at least locally covered by a shielding flux. The shielding flux protects the welded zone from oxidation during welding.

With the method according to the present invention, it is possible to obtain a welded joint of at least a first metallic substrate in the form of a steel substrate and a second metallic substrate, the first and second metallic substrates being at least partially welded together by narrow gap welding wherein the welded zone comprises a dissolved and/or precipitated pre-coating comprising a titanate and a nanoparticulate oxide.

The titanate is selected from the group of titanates consisting of alkali metal titanates, alkaline-earth titanates, transition metal titanates, metal titanates and mixtures thereof. The titanate is more preferably chosen from among: $Na_2Ti_3O_7$, $NaTiO_3$, $K_2TiO_3$, $K_2Ti_2O_5$ $MgTiO_3$, $SrTiO_3$, $BaTiO_3$, $CaTiO_3$, $FeTiO_3$ and $ZnTiO_4$ and mixtures thereof.

The nanoparticulate oxide is preferably chosen from $TiO_2$, $SiO_2$, $ZrO_2$, $Y_2O_3$, $Al_2O_3$, $MoO_3$, $CrO_3$, $CeO_2$, $La_2O_3$ and mixtures thereof.

By "dissolved and/or precipitated pre-coating", it is meant that components of the pre-coating can be dragged towards the center of the liquid-gas interface of the melt pool because of the reverse Marangoni flow and can be even dragged inside the molten metal. Some components dissolve in the melt pool which leads to an enrichment in the corresponding elements in the weld. Other components precipitate and are part of the complex oxides forming precipitates in the weld.

In particular, when the Al amount of the steel substrate is above 50 ppm, the welded zone comprises inclusions comprising notably Al—Ti oxides or Si—Al—Ti oxides or other oxides depending on the nature of the added nanoparticles. These precipitates of mixed elements are smaller than 5 μm. Consequently, they do not compromise the toughness of the welded zone. The inclusions can be observed by Electron Probe Micro-Analysis (EPMA). Without willing to be bound by any theory, it is believed that the nanoparticulate oxides promote the formation of inclusions of limited size so that the toughness of the welded zone is not compromised.

Finally, the invention relates to the use of a welded joint according to the present invention for the manufacture of pressure vessels, offshore and oil & gas components, shipbuilding, nuclear components and heavy industry & manufacturing in general.

EXAMPLES

The steel substrate having the chemical composition in weight percent disclosed in Table 1 was selected:

| C | Mn | Si | Al | S | P | Cu | Ni | Cr |
|---|---|---|---|---|---|---|---|---|
| 0.054 | 1.61 | 0.15-0.55 | 0.015-0.050 | 0.002 | 0.012 | 0.206 | 0.295 | 0.028 |

| Nb | Mo | V | Ti | B | N | Fe |
|---|---|---|---|---|---|---|
| 0.025 | 0.003 | 0.002 | 0.0013 | 0.0001 | 0.004 | Balance |

The steel substrate was 50 mm thick. It had a tensile strength of 480 MPa and a yield strength of 395 MPa.

Example 1

Samples of 100×150 mm with sidewalls without bevel were prepared. The sidewall to be welded was cleaned from oil and dirt with acetone.

Sample 1 was not coated with a pre-coating.

For sample 2, an acetone solution comprising $MgTiO_3$ (diameter: 2 μm), $SiO_2$ (diameter: 10 nm) and $TiO_2$ (diameter: 50 nm) was prepared by mixing acetone with said elements. In the acetone solution, the concentration of $MgTiO_3$ was of 175 $g \cdot L^{-1}$. The concentration of $SiO_2$ was of 25 $g \cdot L^{-1}$. The concentration of $TiO_2$ was of 50 $g \cdot L^{-1}$. Then, the cleaned sidewall of sample 2 was coated with the acetone solution by spraying. The acetone evaporated. The percentage of $MgTiO_3$ in the dried pre-coating was of 70 wt. %, the percentage of $SiO_2$ was of 10 wt. % and the percentage of $TiO_2$ was of 20 wt. %. The pre-coating was 50 μm thick.

Samples 1 and 2 were each positioned side by side with a bare sample of the selected steel substrate spaced by a 13 mm gap and welded by Narrow Gap Gas Metal Arc Welding by conducting weld passes until the gap was filled and the joint was complete. The welding parameters are in the following Table 2:

| Electric current (A) | Speed ($cm \cdot min^{-1}$) | Voltage (V) | Diameter negative electrode (mm) | Protective gas and flow (l/min) |
|---|---|---|---|---|
| 125 | 22 | 25-50 | 1.2 | Ar + 8%$CO_2$ 18 |

The composition of the consumable electrode used in both cases is in the following Table 3:

| C | Si | Mn | Fe |
|---|---|---|---|
| 0.078 | 0.85 | 1.46 | balance |

Sample 1 was welded in 12 passes while Sample 2 was welded in 10 passes. This first result already shows that the pre-coating according to the invention increases the deposition rate and productivity of the narrow gap welding.

It was also observed that the wetting of the weld metal on the bevel surface was improved in Sample 2 compared to Sample 1.

After narrow gap welding, the weld of both welded assemblies was inspected first visually and secondly by ultrasound (both linear and volumetric). The welds were also analyzed macrographically and micrographically, notably by Liquid Penetrant Inspection (LPI). Charpy impact tests were also performed in the weld metal at room temperature and −40° C.

Results are summarized in the following Table 4:

| Evaluation of welded samples | Sample 1 | Sample 2* |
|---|---|---|
| Visual inspection of the joint | OK | OK |
| Ultrasonic inspection of the joint | Not OK | OK |
| Penetrating Liquids of the joint | OK | OK |
| Macrographic analysis | Defects (lack of sidewall fusion and undercutting) | OK |
| Tensile test (UTS in MPa) | 477 ± 6 | 496 ± 12 |
| Charpy impact test at room temperature (J) | 251 ± 27 | 151 ± 4 |
| Charpy impact test at −40° C. (J) | 33 ± 0 | 55 ± 10 |

*according to the present invention

Results show that the pre-coating on the sidewall of the steel substrate improves the narrow gap welding without degrading the mechanical properties of the joint. In particular, the results of the Charpy test at −40° C. showed a positive effect of the pre-coating on the resilience of the material.

Example 2

The effect of different pre-coatings on the welding of steel substrates was assessed by Finite Element Method (FEM) simulations. In the simulations, the pre-coatings comprise nanoparticulate oxides having a diameter of 10-50 nm and optionally $MgTiO_3$ (diameter: 2 μm). The thickness of the coating was of 40 μm. Arc welding was simulated with each pre-coating and the results are in the following

TABLE 5

| | Coating composition (wt. %) | | | | |
|---|---|---|---|---|---|
| Sample | titanate | Nanoparticulate oxides | | | Results |
| 3* | 50% $MgTiO_3$ | 40% $TiO_2$ | 10% YSZ | — | Homogeneous thermal profile. No formation of brittle phases. Maximum temperature in the middle of the steel. Full penetration |
| 4* | 50% $MgTiO_3$ | 15% $TiO_2$ | 35% $Al_2O_3$ | — | Homogeneous thermal profile. No formation of brittle phases. Maximum temperature in the middle of the steel. Full penetration |
| 5* | 50% $MgTiO_3$ | 15% $TiO_2$ | 35% $MoO_3$ | — | Homogeneous thermal profile. No formation of brittle phases. Maximum temperature in the middle of the steel. Full penetration |
| 6* | 50% $MgTiO_3$ | 15% $TiO_2$ | 35% $CrO_3$ | — | Homogeneous thermal profile. No formation of brittle phases. Maximum temperature in the middle of the steel. Full penetration |
| 7 | 50% $MgTiO_3$ | 15% $TiO_2$ | 35% CaO | — | High refractory effect of CaO. Arc heat in the surface of the plate. No full penetration |
| 8 | 50% $MgTiO_3$ | 15% $TiO_2$ | 35% MgO | — | High refractory effect of MgO. Arc heat in the surface of the plate. No full penetration |
| 9* | 50% $MgTiO_3$ | 15% $TiO_2$ | 35% $CeO_2$ | — | Homogeneous thermal profile. No formation of brittle phases. Maximum temperature in the middle of the steel. Full penetration |
| 10 | 50% $MgTiO_3$ | 15% $TiO_2$ | 35% $B_2O_3$ | — | Maximum arc heat in the surface of the steel. No full penetration. Formation of brittle phases |
| 11* | 70% $MgTiO_3$ | 10% $SiO_2$ | 20% $CeO_2$ | — | Homogeneous thermal profile. No formation of brittle phases. Maximum temperature in the middle of the steel. Full penetration |
| 12 | 70% $MgTiO_3$ | 30% $Cr_2O_3$ | | — | Maximum arc heat in the surface of the steel. No full penetration. Formation of brittle phases |
| 13 | 0 | 20% MgO | 70% $Co_3O_4$ | 10% $SiO_2$ | High refractory effect of MgO and $Co_3O_4$. Arc heat in the surface of the plate. No full penetration |
| 14 | 0 | 20% $MoO_3$ | 70% $CeO_2$ | 10% $SiO_2$ | No effect of the flux. No full penetration |
| 15 | 70% $MgTiO_3$ | 30% TiN | | — | No effect of the flux. No full penetration |

*according to the present invention

Results show that the pre-coatings according to the present invention improve the penetration and the quality of the welds compared to comparative examples.

Example 3

For sample 16, a water solution comprising the following components was prepared: 363 $g \cdot L^{-1}$ of $MgTiO_3$ (diameter: 2 μm), 77.8 $g \cdot L^{-1}$ of $SiO_2$ (diameter range: 12-23 nm), 77.8 $g \cdot L^{-1}$ of $TiO_2$ (diameter range: 36-55 nm) and 238 $g \cdot L^{-1}$ of 3-aminopropyltriethoxysilane (Dynasylan® AMEO produced by Evonik®). The solution was applied on the sidewall of the steel substrate and dried by 1) IR and 2) NIR. The dried pre-coating was 40 μm thick and contained 62 wt % of $MgTiO_3$, 13 wt % of $SiO_2$, 13 wt % of $TiO_2$ and 12 wt % of the binder obtained from 3-aminopropyltriethoxysilane.

For sample 17, a water solution comprising the following components was prepared: 330 $g \cdot L^{-1}$ of $MgTiO_3$ (diameter: 2 μm), 70.8 $g \cdot L^{-1}$ of $SiO_2$ (diameter range: 12-23 nm), 70.8 $g \cdot L^{-1}$ of $TiO_2$ (diameter range: 36-55 nm), 216 $g \cdot L^{-1}$ of 3-aminopropyltriethoxysilane (Dynasylan® AMEO produced by Evonik®) and 104.5 $g \cdot L^{-1}$ of a composition of organofunctional silanes and functionalized nanoscale $SiO_2$ particles (Dynasylan® Sivo 110 produced by Evonik). The solution was applied on the sidewall of the steel substrate and dried by 1) IR and 2) NIR. The dried pre-coating was 40 μm thick and contained 59.5 wt % of $MgTiO_3$, 13.46 wt % of $SiO_2$, 12.8 wt % of $TiO_2$ and 14.24 wt % of the binder obtained from 3-aminopropyltriethoxysilane and the organofunctional silanes.

In all cases, the adhesion of the pre-coating on the steel substrate was greatly improved.

The beneficial effects of the invention have been illustrated in the case of the Narrow Gap Gas Metal Arc Welding. They are nevertheless extendable to other narrow gap welding technologies, such as notably Narrow Gap Gas Tungsten Arc Welding and Narrow Gap Submerged Arc Welding since all these techniques use sidewalls coatable with the pre-coating so that the melt pool physics of the narrow gap are modified.

What is claimed is:

1. A method for the manufacture of a welded joint comprising the following successive steps:

providing at least two metallic substrates wherein a first of the two metallic substrates is a steel substrate having a thickness of at least 50 mm and is delimited by at least one sidewall, wherein the sidewall is at least partially coated with a pre-coating including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein the thickness of the pre-coating is between 10 to 140 μm, and welding of the at least two metallic substrates along the at least partially coated sidewall by narrow gap welding.

2. The method as recited in claim 1 wherein the titanate is chosen from the group consisting of: $Na_2Ti_3O_7$, $NaTiO_3$, $K_2TiO_3$, $K_2Ti_2O_5$, $MgTiO_3$, $SrTiO_3$, $BaTiO_3$, $CaTiO_3$, $FeTiO_3$ and $ZnTiO_4$ and mixtures thereof.

3. The method as recited in claim 1 wherein a percentage of the nanoparticulate oxide in the pre-coating is below or equal to 80 wt. %.

4. The method as recited in claim 1 wherein a percentage of the nanoparticulate oxide in the pre-coating is above or equal to 10 wt. %.

5. The method as recited in claim 1 wherein the nanoparticles have a size comprised between 5 and 60 nm.

6. The method as recited in claim 1 wherein a percentage of titanate in the pre-coating is above or equal to 45 wt. %.

7. The method as recited in claim 1 wherein a diameter of the titanate is between 1 and 40 μm.

8. The method as recited in claim 1 wherein the pre-coating further includes a binder.

9. The method as recited in claim 8 wherein the percentage of binder in the pre-coating is between 1 and 20 wt. %.

10. The method as recited in claim 1 wherein the narrow gap welding is done with one welding technique selected among submerged arc welding, gas metal arc welding and gas tungsten arc welding.

11. A method for the manufacture of a pre-coated steel substrate comprising the successive following steps:

providing a steel substrate having a thickness of at least 50 mm and being delimited by at least one sidewall; and depositing, at least partially on the sidewall, a pre-coating solution including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein the pre-coating solution includes from 100 to 500 g/L of the titanate.

12. The method as recited in claim 11 wherein the depositing of the pre-coating solution is performed by spin coating, spray coating, dip coating or brush coating.

13. The method as recited in claim 11 wherein the pre-coating solution further includes a solvent.

14. The method as recited in claim 11 wherein the pre-coating solution includes from 1 to 200 g/L of nanoparticulate oxide.

15. The method as recited in claim 11 wherein the pre-coating solution further includes a binder precursor.

16. The method as recited in claim 11 further comprising drying the pre-coated steel substrate obtained by the depositing step.

17. A coated steel substrate comprising: a steel substrate having a thickness of at least 50 mm and being delimited by at least one sidewall, the sidewall is at least partially coated with a pre-coating including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein the thickness of the pre-coating is between 10 to 140 μm.

18. A method for the manufacture of a welded joint comprising the following successive steps:

providing at least two metallic substrates wherein a first of the two metallic substrates is a steel substrate having a thickness of at least 50 mm and is delimited by at least one sidewall, wherein the sidewall is at least partially coated with a pre-coating including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein a diameter of the titanate is between 1 and 40 μm, and welding of the at least two metallic substrates along the at least partially coated sidewall by narrow gap welding.

19. A method for the manufacture of a welded joint comprising the following successive steps:

providing at least two metallic substrates wherein a first of the two metallic substrates is a steel substrate having a thickness of at least 50 mm and is delimited by at least one sidewall, wherein the sidewall is at least partially coated with a pre-coating including a titanate and a nanoparticulate oxide selected from the group consisting of $TiO_2$, $SiO_2$, $ZrO_2$, $Y_2O_3$, $Al_2O_3$, $MoO_3$, $CrO_3$, $CeO_2$, $La_2O_3$ and mixtures thereof, wherein the pre-coating further includes a binder, the percentage of binder in the pre-coating being between 1 and 20 wt. %, and welding of the at least two metallic substrates along the at least partially coated sidewall by narrow gap welding.

* * * * *